J. A. CURTISS & S. G. BURLEIGH.
Adjustable Sewing-Machine Treadle.
No. 166,969. Patented Aug. 24, 1875.
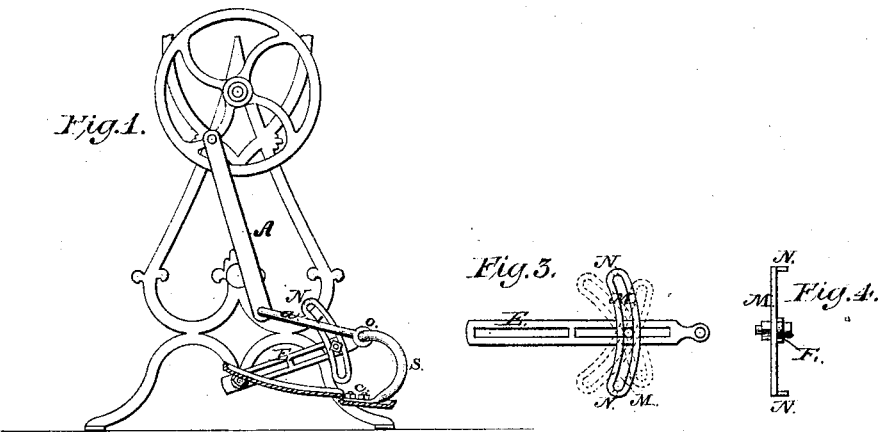
Attest:
Edwin H Burlingame
Samuel D Cleary
Inventors:
James A. Curtiss
Samuel G. Burleigh

UNITED STATES PATENT OFFICE.

JAMES A. CURTISS AND SAMUEL G. BURLEIGH, OF GRAND RAPIDS, MICH.

IMPROVEMENT IN ADJUSTABLE SEWING-MACHINE TREADLES.

Specification forming part of Letters Patent No. 166,969, dated August 24, 1875; application filed May 8, 1875.

*To all whom it may concern:*

Be it known that we, JAMES A. CURTISS and SAMUEL G. BURLEIGH, of Grand Rapids, Kent county, Michigan, have invented an Adjustable Swing-Treadle, of which the following is a specification:

Our invention relates to a swing - motion treadle for machines the bearings of which may be extended or contracted to accommodate the distances between the legs of different machines, and having an adjustable arm, to accommodate pitmen of different lengths, or propelling-wheels set at different heights.

In the drawing, H I, Figure 2, represent foot-plates—H the heel, and I the toe. S represents shafts, bent at O, and attached to foot-plates H I at such points C that when the heel is within the circular heel - rim, and the toes in proper position on toe - plates, the ankle-joints will be in line of angles O of shafts S, the effects of which are, first, the heel H of foot-plates will swing nearly an inch nearer the floor than those of any other device for the purpose; second, by making shafts S in two parts of similar shape, instead of in one piece, as in other treadles, attached at C by bolts or similar devices, they may be easily taken off and compactly packed (as is the case with the foot-plates also) for shipping.

The horizontal parts of shafts S are made hollow or slotted, into which may be inserted rods R, held to their proper places by set-screws, for the purpose of extending or contracting the bearings, to accommodate the distances between the legs of different machines.

The horizontal parts of shafts S are made round, and upon one of them one end of arm A is slipped, and held in any desired position by set-screws or other device, to accommodate any length of pitman, or hold the foot-plates at any desired angle, without changing the length of the pitman or arm, or height of wheel. M E is an adjustable bearing, composed of two or more pieces of any desired shape, held together by bolts or similar devices passing through slots or holes in each in such a manner that each piece may be turned in every conceivable direction. (See Fig. 3.) N, Fig. 4, are lugs upon piece $m$, which piece $m$ may be turned until each lug will press against some portion of the legs of any known sewing-machine. These bearings are held to the machines by bolts passing through piece E and the hole used for the original treadle-rod, and are firmly braced in any desired position by lugs N of piece $m$, bearing against some portion of the legs of the machine, as above described.

We are aware that treadles have been made having a swing-motion, and having a single square horizontal shaft, bent, and passing under the heel of the foot-board, forcing the foot-board about an inch higher from the floor than our invention. Some of the disadvantages of such are, they are heavy and cumbersome, occupy much space in packing, cannot have the adjustable-arm attachment, have no means of extending or contracting the length of the shafts, so that each treadle will fit every machine, but, on the contrary, must have a different-length shaft for each different-width machine, have no adjustable bearing, but must have a different bearing for each different machine. Such swinging treadle, or any part thereof, we disclaim any desire to get patented; but What we do claim as new, and desire patented, is—

1. A treadle for sewing - machines, having two separate shafts, S, attached to foot-plates H I at points C, in combination with the adjustable bearings M E, substantially as and for the purposes set forth.

2. The hollow shafts S, with extension-rods R, inserted and held to any desired position, by means of set-screws or other device, for the purpose of adjusting the treadle to machines of different widths, substantially as and for the purposes set forth.

3. The arm $a$, attached to horizontal shaft S, and held in any desired position by thumb-screws or equivalents, in combination with the extension-rods R and foot-plates H I, substantially as and for the purposes set forth.

JAMES A. CURTISS.
SAMUEL G. BURLEIGH.

Witnesses:
EDWARD A. BURLINGAME,
W. J. STUART.